United States Patent [19]

Dean

[11] 4,122,227
[45] Oct. 24, 1978

[54] STABILIZED LAMINATED KNIT UPHOLSTERY FABRIC

[75] Inventor: William Bruce Dean, Cornelia, Ga.

[73] Assignee: Johnson & Johnson, New Brunswick, N.J.

[21] Appl. No.: 685,858

[22] Filed: May 12, 1976

[51] Int. Cl.² .............................................. B32D 7/14
[52] U.S. Cl. ................... 428/197; 428/198; 428/246; 428/255
[58] Field of Search ................. 156/290, 291, 148; 428/195–198, 206, 253, 255, 246

[56] References Cited

U.S. PATENT DOCUMENTS

| | | |
|---|---|---|
| 1,903,960 | 4/1933 | Dreyfus ............................ 428/253 |
| 3,257,262 | 6/1966 | Epstein ............................ 428/197 |
| 3,366,528 | 1/1968 | Takekawa ........................ 428/253 |
| 3,385,750 | 5/1968 | McCormack et al. ............. 428/197 |
| 3,496,042 | 2/1970 | Wyness ............................ 428/253 |
| 3,600,259 | 1/1969 | Smith et al. ..................... 428/197 |

Primary Examiner—James J. Bell
Attorney, Agent, or Firm—Charles J. Metz

[57] ABSTRACT

A stabilized laminated knit fabric for use as upholstery material. The knit upholstery fabric includes a face fabric consisting of upholstery yarns in a knitted construction and a lightweight, flexible substantially non-extensible back fabric, the face and back fabrics adhered in a stabilized, virtually non-extensible, laminated knit upholstery fabric.

8 Claims, 5 Drawing Figures

STABILIZED LAMINATED KNIT UPHOLSTERY FABRIC

BACKGROUND OF THE INVENTION

This invention relates to knit fabrics for use as upholstery material. More particularly, this invention concerns knit fabrics which are stabilized and are substantially non-extensible so as to be suitably used for upholstery purposes.

Upholstery fabrics, such as fabrics to cover furniture and the like, are commonly and conventionally made by weaving the upholstery yarns into the desired pattern and style. To get a variety it is, of course, known to combine different size yarns, color combinations and various weaves including plain, twill, jacquard and dobby; dyeing the yarns and printing also serve to vary the patterns of particular upholstery fabrics.

Besides the reason that weaving of upholstery fabrics is basic and conventional, woven upholstery fabrics are strong and stable, tend to have good abrasion resistance to provide longer use, and are not highly susceptible to yarn pull-out, especially in a tight weave construction. While these advantages of woven upholstery fabrics add to the desirability of the product, there are also a number of disadvantages of woven upholstery fabrics which must be taken into consideration.

After an upholstered piece of furniture, such as a chair, has been sat upon, especially for long periods of time, a distortion of the upholstery fabric is observed. This distortion appears as either a puckered or buckled fabric, or a bubble in the fabric and sometimes a noticeable wrinkle. While this distortion generally is not permanent, the recovery time for the fabric to return to normal is sufficiently long for the fabric to appear somewhat unsightly and disheveled.

Another disadvantage in woven upholstery fabrics is the limitation of the number of rich and heavy type designs and patterns which can be produced. To achieve a more fancy or rich pattern jacquard-woven fabrics are usually necessary. Jacquard weaving is an intricate process which involves a series of punched cards, one card for each pick in the weave, for controlling the actions of the warp threads. The constraint on the equipment required thereby limits the availability of patterns which may evolve.

Recognizing some of these problems associated with woven upholstery fabrics, the upholstery trade has been considering the use of knitted fabrics to overcome the previous troubles. Up to now, however, there has been no penetration of the upholstery fabric market by knit upholstery fabrics. Besides the fact that knit upholstery fabrics would open up a new market for that type of product, there has not been acceptance of knit upholstery fabrics because new problems have been generated in attempting to overcome problems associated with woven upholstery fabrics. For instance, whereas woven fabrics are basically non-extensible, or only slightly extensible, rigid structures, knit fabrics are typically highly extensible or stretchable fabrics. The extensibility of knit fabrics produces a degree of instability in the fabric which allows easy fabric distortion and presentation of an uneven pattern. This uneven pattern and fabric instability is especially prevalant when the knit upholstery fabric is wrapped and fitted around corners of the upholstered item.

Another problem related to knit fabrics is yarn pull-out. Due to the construction of knit fabrics, if a yarn breaks due to snagging, an imperfection, or from wear, that yarn may very easily be raveled from the fabric causing a run in the fabric. The appearance of this fabric with the run is unattractive, while the fabric strength is diminished since the fabric is more susceptible to additional ravelings.

As a means of controlling stretch of knit fabrics and preventing yarn pull-out, it has been heretofore suggested in the art to coat the back of the fabric with a thin latex coating. Whereas the latex coating suitably serves the purpose of preventing the knitted yarns from shifting and from being pulled-out, the stretch control feature is relative and depends upon the characteristics and amounts of coating used. Furthermore, the stretch of the knit fabric, while being controlled by the latex coating, is not reduced to the point of virtual non-extensibility. Moreover, the latex coating adds undesirable stiffness to the knit fabric, and depending on the amount used, also adds unnecessary weight to the fabric. Consequently, use of a thin latex coating on the back of the knit upholstery fabrics has some advantages, but leaves room for further improvement.

On the other hand, it has been suggested that simple stitching operations of knit fabrics, including those which may be used for upholstery, may stabilize the fabric thereby reducing stretch. While this suggestion has merit regarding stabilization, overlooked is the problem of yarn pull-out, especially when the knitted fabric incorporates lay-in yarns. Stitching the knitted fabric does not control yarn pull-out which leaves that fabric in a condition to have runs and yarn raveling when one or more yarns break from various reasons.

There have been further problems in the production of a fabric with a knitted configuration using upholstery yarns designed specifically for woven fabrics. Various yarns of different texture, size, weight, crimp, etc., have been sampled to arrive at a combination of properties which will produce a suitable knit fabric with the desired coarse upholstery look. While to some extent there has been some previous success in making such a fabric per se, there still remains problems of lack of stability and yarn pull-out with which to contend.

It is recognized that the stability of some fabrics, whether woven, nonwoven or knitted, has been improved by combining the primarily unstable fabric with a fusible fabric. For instance, fusible fabrics such as taught in U.S. Pat. Nos. 3,616,150; 3,449,287 and 3,223,575, and British Pat. No. 1,420,261, among others, are used to provide shape retention to sections of articles of wearing apparel, and also to add stiffness, shape, extra padding and boardiness to apparel that otherwise may look lifeless, or to add warmth to garments. However, whereas fusible fabrics are known in the wearing apparel field, heretofore such fusibles have not been combined with upholstery fabric for purposes of stabilization. There are believed to be a number of reasons for this result.

Until very recently, when tests by various fabric manufacturers started on knitted upholstery, all commercial upholstery fabric has been woven. Being woven, the upholstery fabric is intrinsically stable, thus there has been no need to provide further stabilization. Further, there has been no perceptible market for knit upholstery fabric due to problems inherent in knitted products, viz., too much stretch and yarn pull-out, and also due to difficulties in knitting yarns of the proper characteristics to be suitable for upholstery purposes. Without a market for knit upholstery fabrics there is clearly a need for improvements in that type of specialized product which will generate new interest, attention and eventual acceptance of knit upholstery fabrics.

SUMMARY OF THE INVENTION

A knit fabric for use as upholstery material has been discovered which overcomes the disadvantages of woven upholstery fabrics while improving upon the advantages of knit upholstery fabrics. By using a fabric with a knitted construction the pattern capabilities which may be devised and carried out substantially exceed those of woven upholstery fabrics. This advantage also allows more heavy and rich patterns to be made on less intricate and sophisticated equipment than for example, the jacguard weave looms. Also, since the knitting machines are more readily available than sophisticated weaving equipment the expense of shifting the manufacture of upholstery fabrics from woven to knit is minimized.

A significant advantage of the present invention is the degree of stabilization which is provided to the knit upholstery fabric. By stabilization is meant the control of stretch in the fabric so that it will retain its shape and size and have little or no pattern distortion. The fabric of this new invention is stabilized such that it is generally non-extensible and resembles a woven fabric. This excellent stabilization allows the new knit upholstery fabric to be applied to, e.g., a furniture frame with virtually no pattern distortion. While the new knit fabric is generally non-extensible there is a slight give to the fabric so that it may be stretched controllably onto the furniture frame, around corners, and the like. This slight or controlled stretch enhances the ease of fabricating furniture. Along with the stabilization feature, the fabric has good strength and long wear properties.

Another advantage of the knit upholstery fabric of this invention is that little or no fabric distortion, puckering or wrinkling is observed after the fabric has been sat upon, such as occurs with woven upholstery fabrics. If some distortion does occur, the time to recover to normal is generally less than the time woven fabrics take to recover. It is believed that, due to the stabilized nature of the knit upholstery fabric, the fabric is constrained from stretching out to pucker or bubble. This feature is very desirable since the knit fabric does not have that used or worn appearance after the upholstered item has been sat upon.

A further advantage of this new knit fabric is its excellent flexibility which is desirable to keep the fabric soft, while allowing the manufacturer ease of application to the furniture frame.

In accordance with the principles of this invention, a stabilized laminated knit fabric for use as upholstery material comprises a face fabric consisting of yarns in a knitted construction, the yarns having sufficient characteristics to be suitable for use in upholstery purposes. Also, the new knit upholstery fabric includes a lightweight, substantially non-extensible flexible back fabric. The face fabric and the back fabric are joined together to form a laminate, adhesive means being the medium which holds the face fabric and back fabric together. This laminated knit fabric is thereby stabilized and is substantially non-extensible.

In its preferred embodiment the knitted face fabric is a double knit fabric to improve the body of the fabric while further enhancing its stability. Also in the preferred embodiment, the back fabric has heat sensitive fusible material incorporated therein, located randomly so that instead of overall bonding between face and back fabrics, the bonding is discontinuous to eliminate stiffness and boardiness properties. Furthermore, the double knitted yarns are upholstery yarns having a weight of at least 8 ounches per square yard (274g./sq.m.), a denier of at least 250, preferably more than 300, and have been textured with random loops in each to provide more bulk and easier fabrication during the knitting process.

While the combination of a substantially non-extensible back fabric with the knitted face fabric eliminates much of the stretch inherent in the knitted face fabric above, as an unexpected advantage the combination of fabrics also prevents yarn pull-out of the knitted fabric. By preventing yarn pull-out this combination of fabrics for the first time allows a knitted upholstery fabric to be produced which economically has all the desirable advantages of a knit fabric and, in addition, is virtually non-extensible and is not susceptible to yarn pull-out. In other words, this combination of fabrics brings together the most desirable features of both knitted and woven upholstery fabrics.

BRIEF DESCRIPTION OF THE DRAWINGS

These and other advantages, features and aspects of the invention will become apparent upon reading the following detailed description and upon reference to the accompanying drawings, in which.

While the invention will be described in connection with a preferred embodiment, it is understood that it is not intended to limit the invention to that embodiment. On the contrary, it is intended to cover all alternatives, modifications and equivalents as may be included within the spirit and scope of the described invention.

DETAILED DESCRIPTION OF THE DRAWINGS

Figure 1:
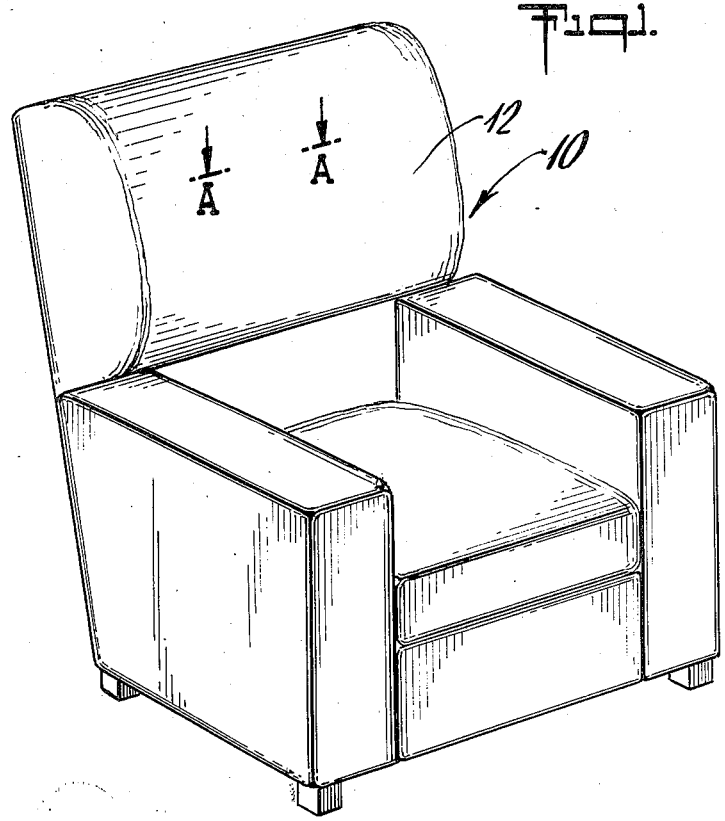
FIG. 1 is a perspective view of a chair upholstered with the new knit fabric.
Figure 2:
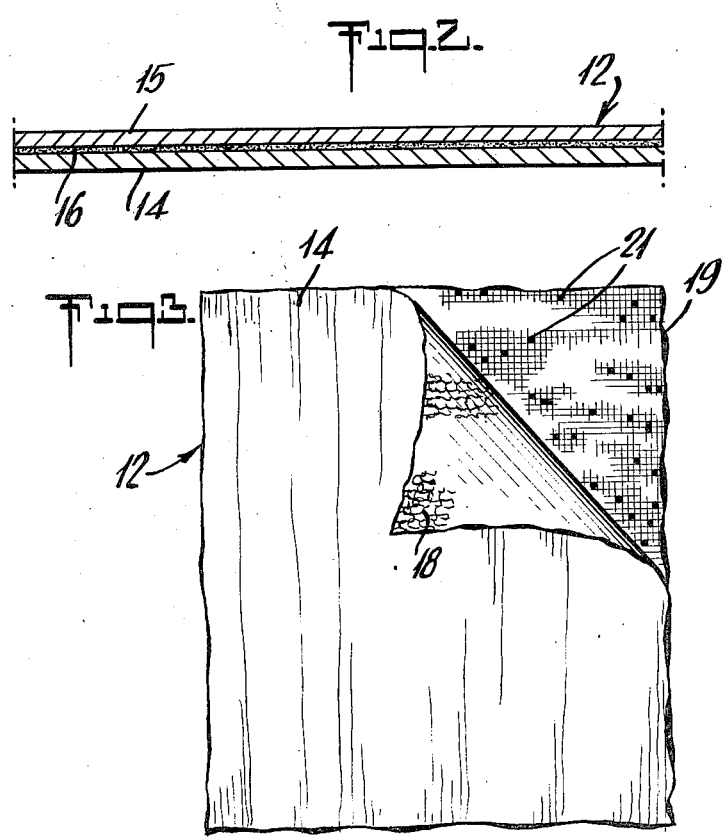
FIG. 2 is a sectional view taken along line A—A of FIG. 1.
Figure 3:
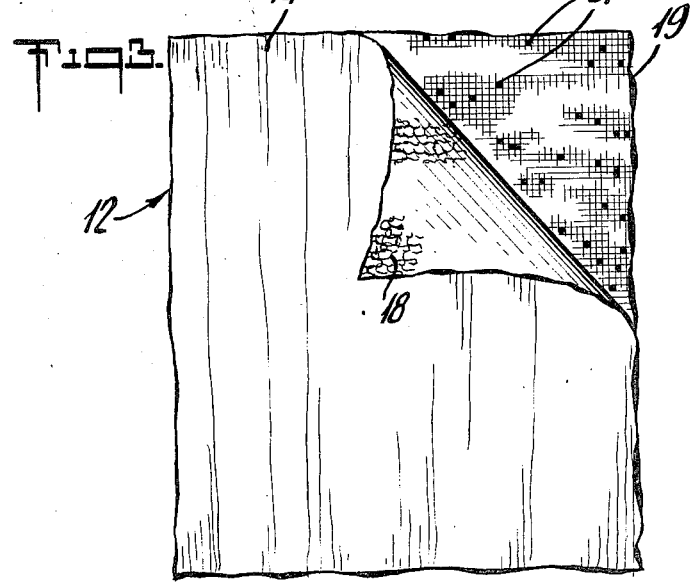
FIG. 3 is a plan view of a section of the fabric of the invention.

Adverting to the drawings in which a preferred embodiment is illustrated, there is shown in FIG. 1, an upholstered item, such as a chair 10, covered with a knit upholstery fabric 12. The knit upholstery fabric 12 is formed of a laminate of a face fabric 14, a back fabric 15 and an adhesive layer or material 16 to join and hold the face fabric 14 and the back fabric 15 together, as best seen in FIGS. 2 and 3.

Figure 4:
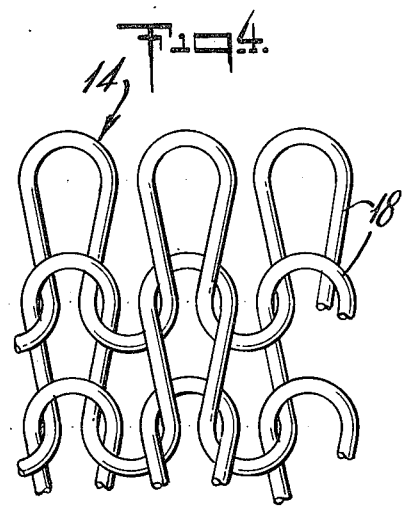
FIG. 4 is an enlarged plan view of the face fabric of the invention.

The face fabric 14 contains upholstery yarns 18 in a knitted construction such as seen in FIG. 4. Any of the standard knits may be employed, depending upon desirability of patterns, availability of materials and equipment and choice of overall design. However, since the knit fabric is to be used for upholstery purposes, the yarns 18 selected must have sufficient characteristics to be suitable for those purposes. Specifically, these characteristics include yarn strength, weight, size, abrasion resistance, appearance, texture and drape, especially for ease of fabrication during knitting. In combination, the characteristics of upholstery yarn must be fairly strong and tough to withstand the weight of people sitting on the upholstered item so as not to readily tear, while providing good functional use and appearance over an extended time period; the yarn must be able to withstand a good tight fit when the fabric is firmly secured to the furniture frame so as not to induce tears or rips, especially near the furniture tacks; and the yarn must readily lend itself to standard, economical knitting operations. In general, upholstery yarns forming a fabric having a weight of at least 8 ounces per square yard (274 g./sq.m.), and having a denier of at least 250, and preferably more than 300, are sufficient to impart the characteristics needed to make a satisfactory upholstery material.

Many different yarn materials such as cotton, linen, silk, and synthetic materials including nylon, polyester, polyolefin, and blends of materials may be selected for use in this new knit fabric. Polypropylene yarns of the continuous filament type are idealy suited for this knit fabric. To give good appearance and softness to the fabric textured or crimped yarns are suitable employed; these yarns add more bulk thereby producing a more heavy and full expression in the fabric. Furthermore, yarns textured with loops in each, such as the TASLANIZED textured yarns, not only contribute to that look which distinguishes upholstery fabric, but also are soft and flexible thereby providing compatibility with the looping steps of knitting to provide a smooth running, economical operation.

When more body and stability of the knit fabric is desired, a double knit fabric may be utilized. The use of double knits is preferred in the fabric of this invention since double knits are firmer and heavier than single knit fabrics, and make excellent upholstery material. Modifications of the double knit construction, such as the inclusion of a lay-in yarn, offer the advantages of a wide variety of patterns, adding bulk to the fabric, and also adding softness or fleeciness to the fabric.

To provide stability to the knit upholstery fabric 12 a back fabric 15 is included. Since knit fabrics inherently possess high stretch or extension properties, the back fabric 15 is incorporated in the upholstery fabric to eliminate undesirable stretch properties which detract from the stability of the fabric. To accomplish this result the back fabric 15 is a substantially non-extensible material. That is, the back fabric is sufficiently rigid in structure so that it does not yield to force to substantially change its original dimensions; or the fabric has a slight or controlled stretch with an extensibility generally less than 10% beyond the original dimensions thereof. Of course, the non-extensible back fabric also has to be compatible with the knit fabric in its upholstery function; lightweight, flexible materials generally satisfy this compatibility requirement.

While many types of lightweight, flexible, substantially non-extensible materials may be appropriately employed, a lightweight woven textile fabric is most suitable. Woven fabrics made with non-elastic yarns are intrinsically non-extensible, and may be combined with knit fabrics to reduce or eliminate the stretch properties. Scrim fabrics which are generally non-extensible may be used accordingly.

In order to combine the face fabric 14 and the back fabric 15 so that the non-extensible features of the back fabric are imparted to the finished knit fabric the two fabrics are joined and held together by an adhesive material 16. The adhesive material 16 may be a layer of pressure-sensitive adhesive, glue, hot-melt or any other substance capable of bonding the face and back fabrics together by surface attachment. As seen in FIG. 2, the adhesive material 16 may be applied either to the interior surface of the face fabric 14 or to one surface of the back fabric 15 so that surface to surface adjoining can take place. The effect of joining the face and back fabrics is to produce a laminated knit fabric which is stabilized and generally non-extensible due to the virtual non-extensibility characteristics of the back fabric.

Figure 5:
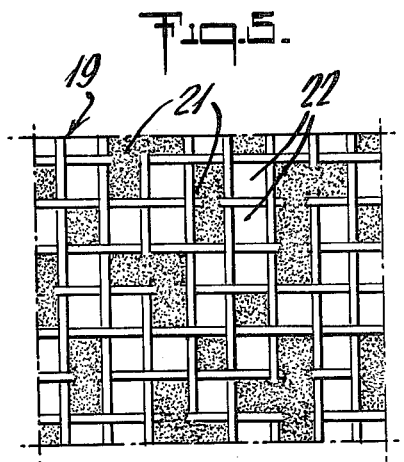
FIG. 5 is an enlarged plan view of the preferred back fabric of the invention.

Instead of applying a separate layer of adhesive material 16 between face and back fabrics for joining purposes, a fusible back fabric 19 is preferably used. The fusible back fabric 19 may be a lightweight woven or nonwoven textile material which has incorporated into or onto the surface layer discrete amounts of solid fusible compositions, such as thermoplastic granules 21 including cellulose acetate, vinyl resins, polyolefin resins, polyamide resins, acrylic resins and the like. In the preferred embodiment the thermoplastic granules 21 are sprinkled randomly on one surface of a lightweight woven textile back fabric 19. The granule-coated woven fabric is heated sufficiently to soften the thermoplastic granules causing them to adhere to that surface of the fabric at random locations as seen in FIG. 5. The random distribution of thermoplastic materials 21 on a surface of the back fabric also leaves many open areas such as the interstices 22 between yarns. This arrangement allows for a discontinuous bonding between face and back fabrics which maintains flexibility in the laminated fabric. While the woven back fabric may be selected from many compatible materials in a variety of different weaves, a cotton fabric woven in a plain weave with between 20 and 40 threads per inch (7.9 and 15.8 threads per cm.) in each direction performs very satisfactorily.

The back fabric 19 is then mated to the face fabric 14 so that the interior surface of the face fabric is in contact with the granule-coated fusible surface of the back fabric. By applying heat and pressure, such as by a heated pair of nip rolls, the granules 21 on the back fabric soften and melt, becoming randomly and discontinuously fused to the face fabric 14 as well as the back fabric 19, thereby forming a laminated fabric. This laminated fabric is strong, stabilized and flexible and possesses the non-extensible features of the woven back fabric; also, due to the lightweight nature of the woven back fabric, even with the fusible particles no undesirable stiffness is added to the knit fabric which retains its flexural ease.

One instance of the invention will be described in greater detail in the following specific example, given primarily for the purposes of illustration.

EXAMPLE

A stabilized laminated knit upholstery fabric is formed by knitting a face fabric with a double knit construction with a lay-in yarn. The fabric material is 100% polypropylene having a denier of 300. The yarns have been TASLANIZED textured for additional bulk; the weight of the knitted face fabric is approximately 12 ounces per square yard (411 g./m.$^2$). As the lightweight substantially non-extensible back fabric there is provided a woven fabric consisting of 100% cotton yarns, both fill and warp yarns having a cotton count of 30/1. The cotton back fabric is woven in a plain 1/1 weave, there being approximately 40 threads per inch (approx. 16 threads/cm.). This cotton fabric has a weight of about 812 grains per square yard (62.9 g./m.$^2$). Fusible polyethylene is applied randomly to one surface of the cotton fabric so that the weight of the polyethylene is approximately 20 grains per square yard (1.55 g./m.²). The polyethylene is applied in granules having an average size of about 400 microns, the granules having a melting temperature of about 230° F. (110° C.). By heating the cotton fabric with the thermoplastic granules above their melting temperature, the granules soften and become adhered to one surface of the woven fabric. This fusible back fabric is mated with the above face fabric and a laminate is formed by pressing the two fabrics together while applying sufficient heat to soften the particles so that they will bond to the adjacent surfaces. The two fabrics become adhered together by a discontinuous bond formed by the fusible thermoplastic thereby forming a stabilized substantially non-extensible knit upholstery fabric.

By way of comparison the stabilized laminated knit fabric as prepared above was tested for degree of extensibility against a similar knit fabric, made of the exact same fabric as the face fabric above, but coated with a latex backing as is known in the art. In the test, samples were measured for extension on an Instron tensile tester, using sample strips of 1 inch (2.54 cm.) by 6 inches (15.24 cm.), and settings of 4 inch (10.16 cm.) jaw speed, 4 inch (10.16 cm.) jaw spacing and 8 inches/minute (20.32 cm./min.) chart speed. All samples were subject to elongation uner a 10 pound (4.53 kg.) load. The results of the test were as follows:

| Samples | Elongation Under 10 lb. load | |
|---|---|---|
| | Warp | Fill |
| 1) 100% polypropylene face fabric - 4.24% latex add-on- (Rohm & Hass' HA-8) | 41.9% | 28.8% |
| 2) 100% polypropylene face fabric - 12.7% latex add-on- (Rohm & Hass' HA-8) | 46.3% | 14.4% |
| 3) 100% polypropylene face fabric - 25.9% latex add-on- (Rohm & Hass' HA-8) | 42.5% | 13.8% |
| 4) 100% polypropylene knit face fabric - woven fusible fabric backing | 3.3% | 7.9% |

These results clearly show that the laminated knit upholstery fabric of this invention, sample No. 4, is virtually non-extensible and consequently very stable. In comparison the extensibility of knit fabrics with latex backings, samples 1-3, is many times greater than the knit fabric with the fusible woven backing, especially in the warp direction. Furthermore, although the tests indicate that the extension in the fill direction may be decreased with a higher add-on of latex on those samples tested, the higher add-on of latex imparts undesirable stiffness to the fabric along with unnecessary weight. Thus, the laminated knit fabric of this invention not only provides a stable substantially non-extensible fabric, but does so with a lightweight, flexible fabric which is very compatible with the intended function of the upholstery knit.

Thus, it is apparent that there has been provided in accordance with the invention, a stabilized laminated knit upholstery fabric that fully satisfies the aims, advantages and aspects as set forth above. While the invention has been described in conjunction with specific embodiments thereof, it is evident that many alternatives, modifications and variations will be apparent to those skilled in the art in view of the foregoing description. Accordingly, the plenary invention is intended to embrace all such alternatives, modifications and variations as fall within the broadest spirit and scope of the described invention.

What is claimed is:

1. A stabilized laminated knit fabric for use as upholstery material comprising: a face fabric consisting of yarns in a knitted construction, said face fabric having a weight of at least 8 ounces per square yard, said yarns having a denier of at least 250 and having sufficient characteristics to be suitable for use in upholstery purposes; and a lightweight, substantially non-extensible flexible back fabric, said face fabric and said back fabric being laminated and held together by adhesive means, whereby the laminated knit fabric is stabilized and is generally non-extensible.

2. A stabilized laminated knit fabric as defined in claim 1 wherein said face fabric consists of yarns in a double knit construction.

3. A stabilized laminated knit fabric as defined in claim 1 wherein said yarns are textured with random loops therein.

4. A stabilized laminated knit fabric as defined in claim 1 wherein said back fabric is a woven textile fabric.

5. A stabilized laminated knit fabric as defined in claim 1 wherein said back fabric has solid fusible thermoplastic granules incorporated on at least one surface thereof in a random and discontinuous distribution, said granules being the adhesive means holding said face fabric and said back fabric together in laminate.

6. A stabilized laminated knit upholstery fabric comprising: a face fabric consisting of upholstery yarns in a double-knit construction, said yarns having a denier of at least 250 to form said face fabric having a weight of at least 8 ounces per square yard; and a lightweight, substantially non-extensible flexible back fabric, said face fabric and said back fabric being laminated and held together by adhesive means, whereby the laminated knit fabric is stabilized and is generally non-extensible.

7. A stabilized laminated knit upholstery fabric as defined in claim 6 wherein said yarns are textured with random loops therein.

8. A stabilized laminated knit upholstery fabric as defined in claim 6 wherein said back fabric is a woven textile fabric having heat sensitive fusible material incorporated on at least one surface thereof in a random and discontinuous distribution, said fusible material being the adhesive means holding said face fabric and said back fabric together in a laminate.

* * * * *